March 25, 1941. J. K. LUND 2,236,293
CONTROLLING DEVICE FOR THE ENDS OF DISCHARGE PIPES
Filed April 4, 1938
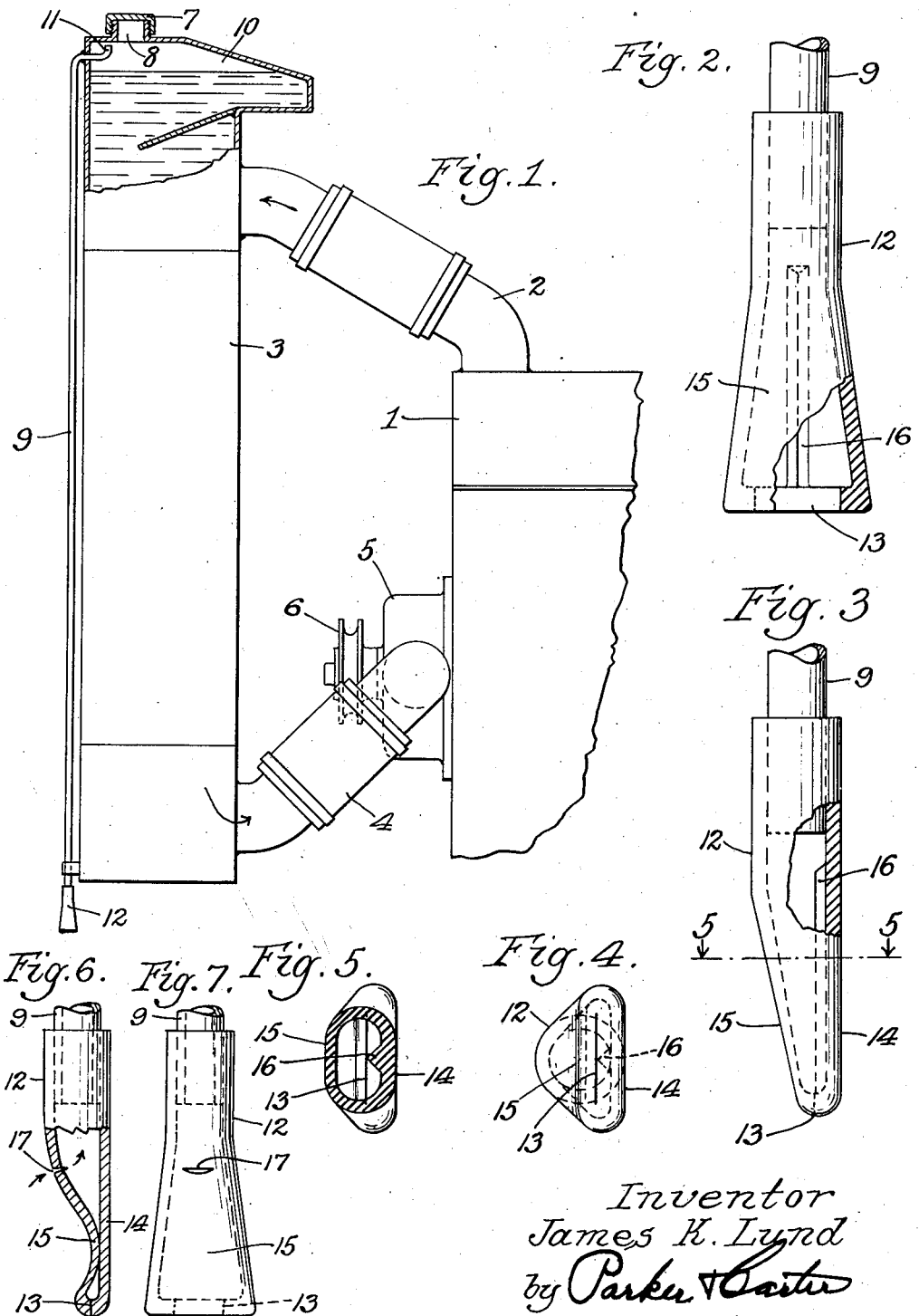
Inventor
James K. Lund
by Parker & Carter
Attorneys.

Patented Mar. 25, 1941

2,236,293

UNITED STATES PATENT OFFICE 2,236,293

CONTROLLING DEVICE FOR THE ENDS OF DISCHARGE PIPES

James K. Lund, Oak Park, Ill., assignor to The Dole Valve Company, Chicago, Ill., a corporation of Illinois Application April 4, 1938, Serial No. 199,761

2 Claims. (Cl. 123—174)

This invention relates to controlling devices for the ends of discharge pipes, such as overflow or vent pipes for automobile radiators, and has for its object to provide a new and improved device of this description.

When automobiles are used in cold weather, it is customary to provide in the cooling circulatory system of the engine a non-freezing liquid, such as, for example, alcohol. This liquid passes from the engine jacket through the radiator, cooling in the radiator and passing back to the engine jacket. The radiator is provided with an overflow or vent pipe so as to relieve the pressure and permit the escape of steam and other vapors in case the liquid overheats and boils. When volatile material, such as alcohol is used, if the overflow or vent pipe is left open, much material is lost by the vapors passing out and escaping. One of the objects of this invention is to provide a cheap, easily installed and effective means for closing the end of the vent pipe to prevent the escape of the material under ordinary conditions and to automatically open and relieve the pressure when the pressure in the vent pipe reaches a predetermined amount and before this pressure is sufficient to do any damage to any of the parts.

The invention has further objects which are more particularly pointed out in the accompanying description.

Referring now to the drawing, Fig. 1 is a view of one form of device embodying the invention, with a portion of the motor omitted and a portion of the radiator cover broken away;

Fig. 2 is an enlarged view, with parts broken away, of the end of the radiator vent with the closing device thereon;

Fig. 3 is a view similar to Fig. 2, with the parts turned ninety degrees;

Fig. 4 is a view of the closing device as seen from the bottom;

Fig. 5 is a sectional view taken on the line 5—5 of Fig. 3;

Fig. 6 is a view in section showing a modified construction; and

Fig. 7 is a view of Fig. 6 as seen from the side having the slit intermediate its ends.

Like numerals refer to like parts throughout the several figures.

In the drawing there is illustrated a circulatory cooling system for the internal combustion engine of an automobile. The engine is provided with a water jacket 1. A pipe 2 leads from this water jacket to the radiator 3 and a return pipe 4 returns the cooling liquid to the water jacket, there being preferably a pump 5 located at any convenient place in the circulatory system, for moving the liquid. The pump 5 is operated in any desired manner, as by a belt driven by the engine and engaging the pulley 6.

There is a cap 7 for closing the opening 8 in the radiator through which the cooling liquid is inserted. The radiator is provided with a vent 9 which is a small pipe and which preferably has its upper end extending into the space 10 above the liquid in the radiator, the extreme end 11 being preferably bent as shown.

Some means is provided for closing the end of the pipe 9. This means is arranged so that after any overflow liquid in the pipe 9 reaches a predetermined height, the closed end will open and permit it to escape. As herein shown, the end of the pipe 9 is closed by a valve device 12 which is made of elastic material such as rubber. This valve device is open at one end and the pipe 9 is inserted in this open end. Since the device is made of elastic material, the same device can be used for pipes of different sizes and this is particularly true since these pipes vary only a small amount in size.

The valve device 12 is hollow and is provided at the bottom with a slit 13 which is normally closed. The valve device is preferably flattened out at the lower end. In the construction shown this result is secured by having one side of the valve device straight, as shown at 14, and the opposite side inclined, as shown at 15. One of the sides is preferably thicker than the other, as, for example, the side 14. The lower end of the valve device is also preferably wider than the upper part, as shown, for example, in Fig. 2.

I prefer to provide some means for preventing a vacuum in the system from causing the sides of the valve device to collapse to prevent air from entering to relieve the vacuum. Any suitable means may be used and I have illustrated one construction where there is a rib 16 on the inner face of one of the walls of the device, see Figs. 3 and 5. If the walls are collapsed, with this construction the slit 13 will open sufficiently to let in air to relieve the vacuum. This device can be arranged to open when there is a predetermined pressure in the pipe 9. It will ordinarily be arranged to open when there is a pressure equal to several inches of liquid in the pipe. For example, it may be arranged to start to open at one-fourth pound pressure and fully open at one pound pressure.

This device therefore provides a closed pipe 9 and therefore a closed system so that vapors cannot escape.

In Figs. 6 and 7 I have shown another form for breaking a vacuum in the system. The liquid accumulates in the overflow pipe due to the surging in the top of the radiator and condensation of the vapors formed at the fluid level in the radiator, which vapors pass on down the overflow pipe, and this is particularly true where alcohol is used. Under normal driving conditions the pressure of the column of liquid will not be sufficient to open the pressure slit 13 at the bottom of the valve device or the vacuum slit 17 in the side wall thereof. It often happens that when the automobile is stopped and the radiator fluid cools, the vapors in the space above the fluid level are condensed. Under these conditions a vacuum is created in the radiator. This causes the accumulated liquid in the overflow pipe to be drawn back into the radiator. This vacuum also causes the thin portion of the wall of the device to be moved inwardly, that is the walls as it were, collapse, and this causes the slit 17 to open so as to admit air and break the vacuum in the system. After the pressure has been balanced, the parts are returned to their normal position. If overheating occurs so that there will be a high pressure in the radiator, the thin section wall will bulge outwardly and this will open the pressure slit 13 and relieve the pressure in the radiator. If the pressure is very high, the vacuum slit 17 will also open to assist in relieving the pressure.

This device also provides a water or liquid seal, for if opened by the pressure of the liquid, it will close when the liquid reaches a few inches from the lower end of the valve device. It will also be noted that the discharge of the material is in alignment with the pipe 9. This construction does not make any noise or rattle due to the movement of the parts and the automobile. In the use of the device, if there is gas generated, as when alcohol is used, the valve device 12 prevents it from escaping. If there is an overflow into the pipe 9 of the liquid, the valve prevents this escaping until it reaches a predetermined height in the pipe, whereupon the slit 13 opens and lets some of the liquid out. This slit then closes before all the liquid is discharged, so that there will be a water or liquid seal maintained. I prefer to make the device of a single or unitary piece of material.

Among other advantages in having the lower end of the valve device widened is that I am enabled to provide a longer slit and at the same time, have it automatically held closed by the material until the pressure of the liquid above it reaches a predetermined amount.

I have described in detail a particular construction embodying the invention, but it is of course evident that the parts may be varied in many particulars without departing from the spirit of the invention as embodied in the claims hereto appended and I therefore do not limit myself to the particular construction shown.

I claim:

1. A controlling device for the end of a discharge pipe for automobile radiators, comprising a valve device adapted to be connected with the end of the pipe, said valve device comprising a hollow member of elastic material having an open end with which the pipe is connected and having a discharge slit at the other end which is normally closed, means for maintaining said slit closed to hold overflow of liquid from the radiator in said pipe, a second slit in the elastic material of said hollow member located above the first mentioned slit, the first mentioned slit opening when there is abnormal pressure in the radiator to relieve such abnormal pressure, the second slit opens when there is a reduced pressure in said radiator to relieve such reduced pressure.

2. A controlling device for the end of a discharge pipe for automobile radiators, comprising a valve device adapted to be connected with the end of the pipe, said valve device comprising a hollow member of elastic material having an open end with which the pipe is connected and having a discharge slit at the other end at a distance from the open end which is normally closed to maintain liquid in said pipe under normal pressure in the radiator and which opens to relieve abnormal high pressure in the radiator, and means separate from said slit for relieving reduced pressure in said radiator.

JAMES K. LUND.